United States Patent [19]

Stein

[11] 4,224,617

[45] Sep. 23, 1980

[54] LIQUID CRYSTAL DISPLAY

[75] Inventor: Charles R. Stein, Schenectady, N.Y.

[73] Assignee: General Electric Company, Schenectady, N.Y.

[21] Appl. No.: 936,020

[22] Filed: Aug. 23, 1978

[51] Int. Cl.[2] .................... G02F 1/13

[52] U.S. Cl. .................... 340/765; 340/805; 350/332; 350/336

[58] Field of Search .................... 340/765; 350/332, 336

[56] References Cited

U.S. PATENT DOCUMENTS

| | | | |
|---|---|---|---|
| 3,647,280 | 3/1972 | Klein et al. | 350/336 |
| 3,876,287 | 4/1975 | Sprokel | 350/336 X |
| 3,891,307 | 6/1975 | Tsukamoto et al. | 340/765 X |
| 3,930,719 | 1/1976 | Madrid et al. | 350/336 |
| 4,105,297 | 8/1978 | Shimizu | 340/765 X |

*Primary Examiner*—David L. Trafton

*Attorney, Agent, or Firm*—Geoffrey H. Krauss; James C. Davis; Marvin Snyder

[57] ABSTRACT

A liquid crystal display is provided wherein dark characters, symbols and other indicia are displayed against a light background. The electrodes of the display are driven by sinusoidal or square waveforms of multiple frequencies and/or multiple phases in manner such that the electrode leads are essentially invisible during display operation.

23 Claims, 9 Drawing Figures

LIQUID CRYSTAL DISPLAY

BACKGROUND OF THE INVENTION

The present invention relates to information displays and, more particularly, to a novel liquid crystal display and method of driving the electrodes thereof to provide dark indicia upon a light background with essential invisibility of the electrode leads.

Liquid crystal displays are highly desirable due to their relatively low magnitude of power consumption. It is generally known that a desirable liquid crystal display will have a bright background upon which dark characters, symbols and other indicia are displayed. Typically, the indicia are formed of a multiplicity of segments, whereby a driving voltage is required, across the liquid crystal material of the display cell, over all of the background portion to render this portion in the clear, or highly light-transmissive, state. The indicia segments to be displayed in the light-transmissive condition must be driven, while the indicia segments to be displayed in the darkened condition must have the driving voltage removed therefrom. As each indicia-forming electrode segment must be directly connected to a driving voltage source by a conductive lead, the conductive leads on one of the pair of substantially parallel planar electrode surfaces tend to overlap background portions of the other electrode surface. When a particular segment is in the dark condition, and hence not receiving a driving voltage, the connective leads therefore, also being devoid of a driving voltage, causes the liquid cyrstal material associated therewith to be in the dark condition, whereby the segment leads are highly visible. This is especially true in the cholesteric-nematic or parallel-nematic types of liquid crystal displays, and whether or not the liquid crystal material is host to a dichroic dye. Hitherto, there has appeared to be no solution involving either electrode artwork or display drive variations, including any two-phase (0° and 180° phases, by use of an inverter), single frequency scheme which would provide switching of the active segment areas of the cell without also causing at least some of the leads thereto be become visible. Thus, it is highly desirable to provide a liquid crystal cell, having dark indicia upon a light background, in which the leads associated with the indicia-forming electrode areas are not visible during operation of the display.

BRIEF DESCRIPTION OF THE INVENTION

In accordance with the invention, a liquid crystal display cell has a liquid crystal layer formed in the volume between a pair of planar electrodes. Each of the electrodes has at least one indicia-forming segment area. A conductive lead associated with each segment area to one edge of the electrode. The remaining portion of each electrode is a conductive background electrode formed in continuous fashion but insulated, by narrow channels of nonconductive material, from each of the segment areas and the conductive leads therefor. Each of the conductive leads is so positioned as to be in registration only with the background area of the remaining electrode. The background and indicia-forming segment areas of one electrode are driven by voltages having at least a phase difference, while the background area of the remaining electrode is driven by another voltage of waveform having at least a phase difference with respect to the voltage driving the background area of the first electrode, and with the segment electrode areas of the remaining electrode being electrically driven by one of a pair of voltages having a specific phase, frequency, or amplitude relationship with the remaining driving voltages, whereby segment areas of the display are in one or another light-transmissive condition, with the background and lead areas remaining in a highly light-transmissive, or bright, condition.

In one preferred embodiment, all electrode areas are driven by sine waves of a single frequency and constant amplitude, with the segment areas and background area of the the first plate having a 90° relative phase difference. The background area of the remaining plate has a 135° phase difference with respect to each of the waveforms driving the first electrode. The waveform driving both the light-transmissive segments and the background areas has a 45° phase difference relative to the active area of the first plate and 90° phase difference relative to the remaining (light-absorptive) areas of the remaining electrode.

In another referred embodiment, sinusoidal or square waveforms are utilized with the segment and background areas of the first electrode being driven at different frequencies, phases and amplitudes and with each of the remaining electrode areas, forming the background or light-transmissive and light-reflective segment areas of the remaining electrode, being each driven by a voltage having a frequency, phase or amplitude difference with respect both to one another and to the waveforms driving the segment and background areas of the first electrode.

Accordingly, it is an object of the present invention to provide a novel liquid crystal display having dark indicia upon a light background and in which the leads to the indicia-forming segments are substantially invisible against the background.

It is another object of the present invention to provide a method of driving a multi-segmented liquid crystal display to provide invisibility of the leads associated with the indicia-forming segments of the electrodes.

These and other objects of the present invention will become apparent after consideration of the following detailed description, taken in conjunction with the drawings.

Figure 3A:
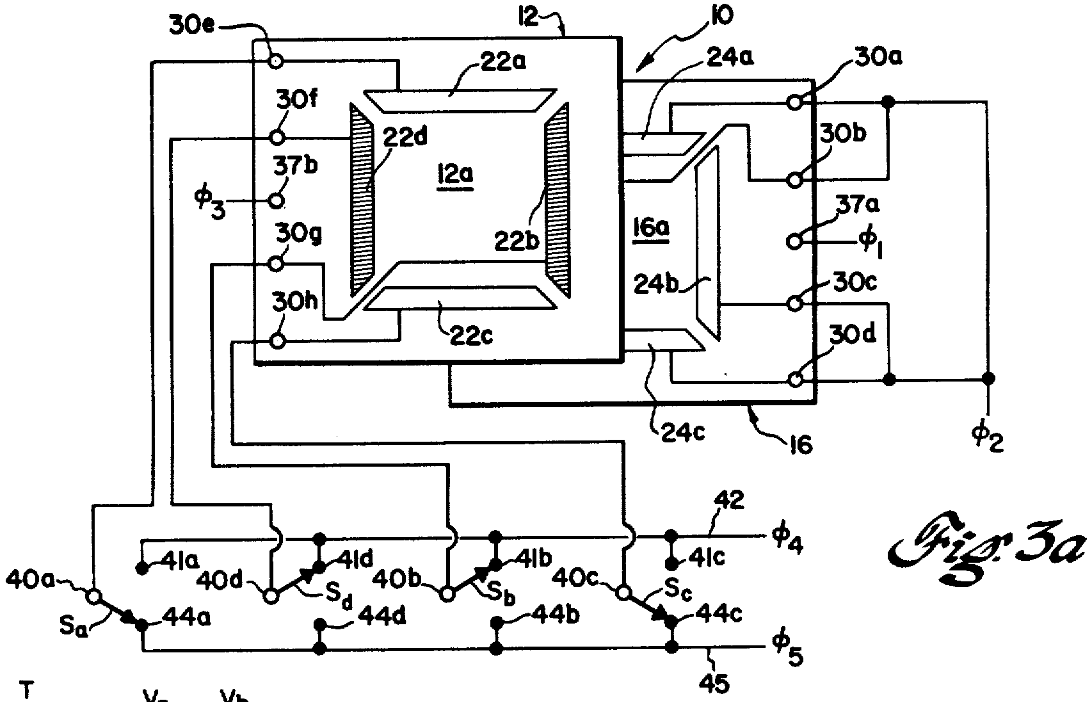
Figure 3B:
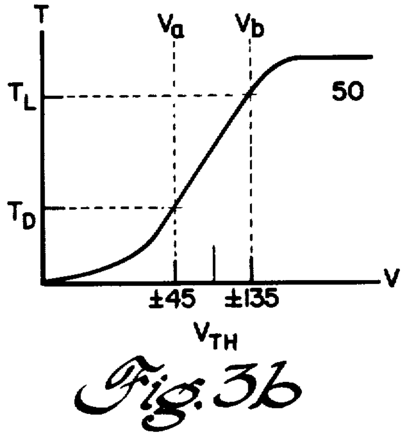
Figure 3C:
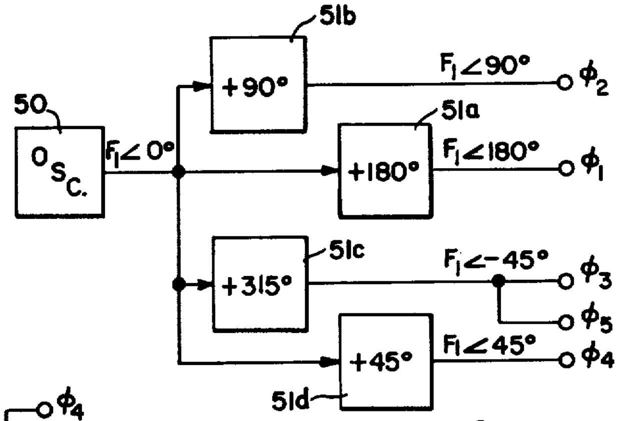
Figure 3D:
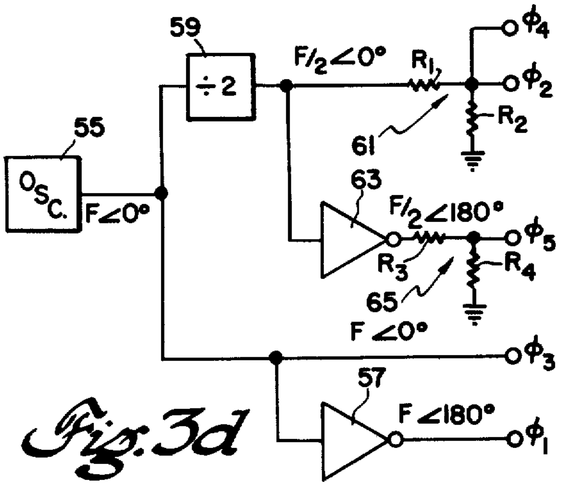
Figure 4:
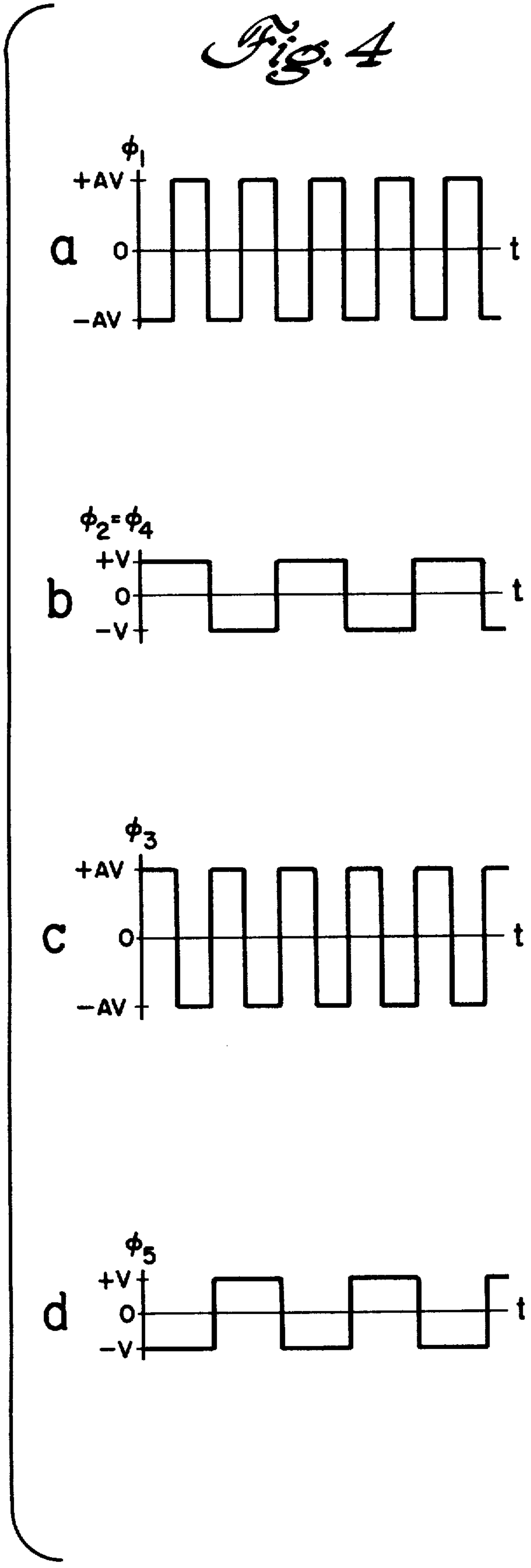
Figure 5:
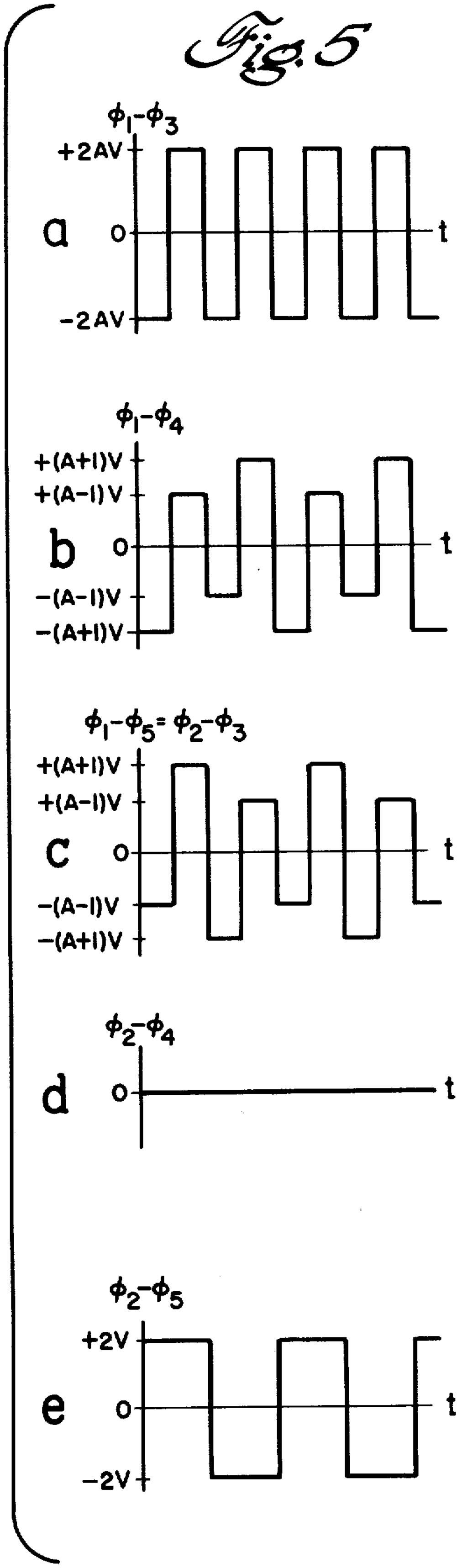

FIGS. *2a* and *2b* are plan views of a pair of electrodes suitable for use in practicing the present invention;

FIG. *3a* is a schematic diagram illustrating the method of driving the various segment and background areas of the pair of electrodes in my novel display cell;

FIG. *3b* is a graph illustrating the relationship between light-transmission conditions of the cell with respect to the driving voltage appearing across the liquid crystal layer;

FIG. *3c* is a schematic block diagram illustrating one possible embodiment of a circuit for driving the liquid crystal display of FIG. *3a,* with multiple-phase waveforms of a single frequency;

FIG. *3d* is a schematic block diagram of one possible circuit for driving the display of FIG. *3a* with waveforms at a plurality of frequencies, phases and amplitudes;

FIG. 4 is a set of coordinated graphs illustrating the driving waveforms available from the driver circuit of FIG. 3*d* and as applied to the cell of FIG. 3*a*; and FIG. 5 is a set of coordinated graphs illustrating the resulting voltage waveforms appearing across the various portions of the liquid crystal material of the display cell when various electrodes are driven by selected ones of the waveforms of FIG. 4.

DETAILED DESCRIPTION OF THE INVENTION

Figure 1:
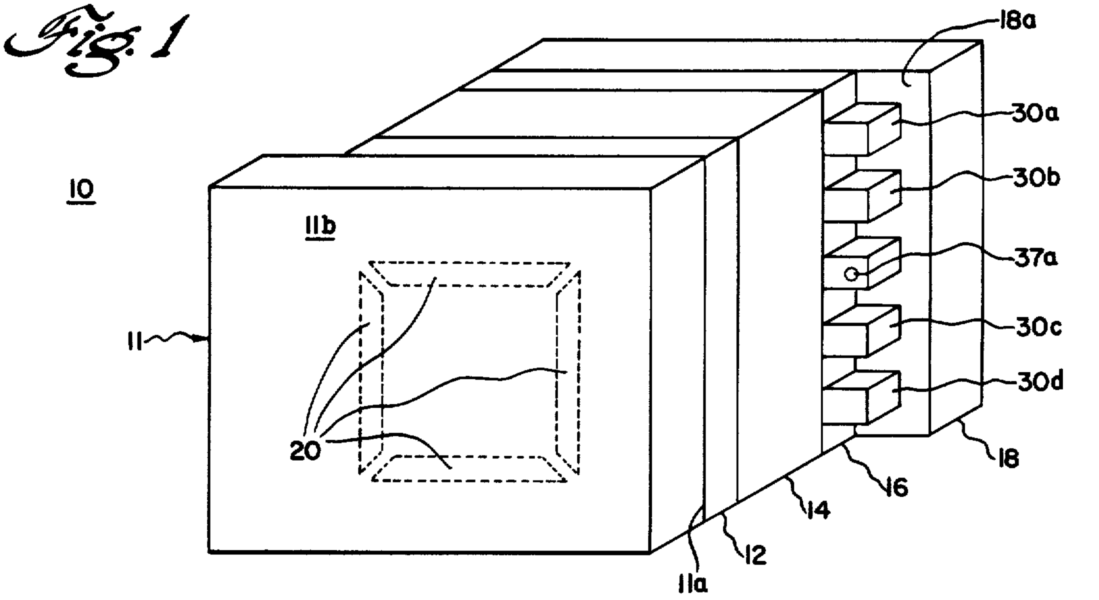
FIG. 1 is a perspective view of a liquid crystal display cell in accordance with the principles of the present invention.
Figure 2A:
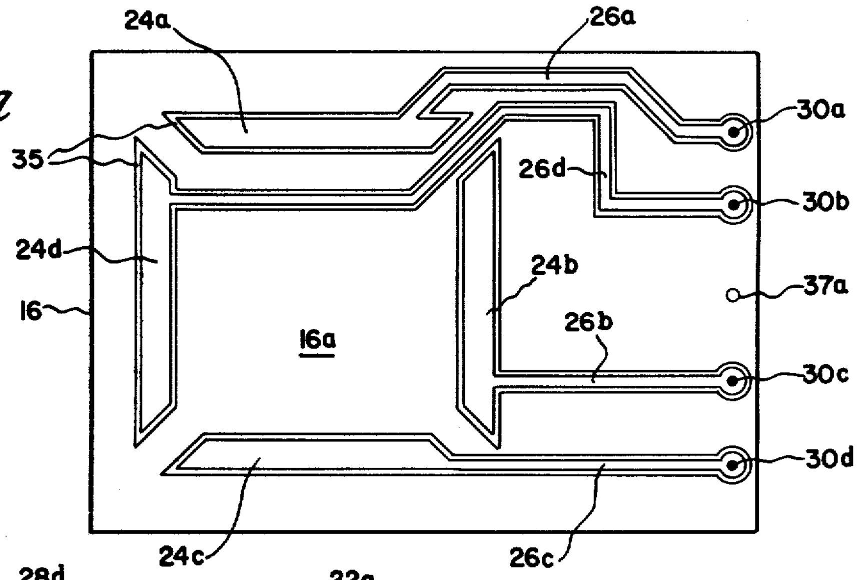
Figure 2B:
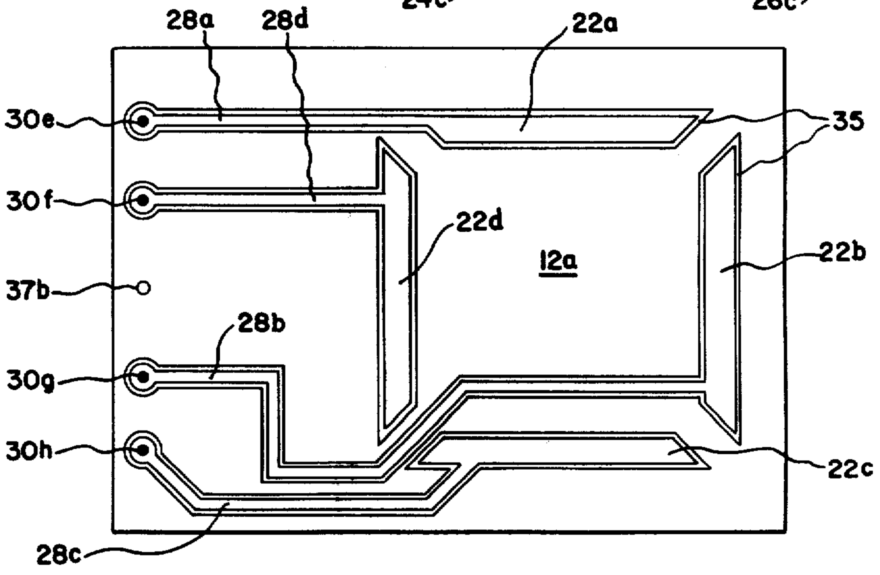

Referring initially to FIGS. 1, 2*a*, and 2*b*, a liquid crystal display cell 10 includes a front substrate 11 of substantially transparent material, such as glass and the like. A first conductive member 12 is fabricated upon an interior surface **11*a* of the front substrate. A layer 14 of liquid crystal material, which may be host to a guest dichroic dye dissolved therein, fills the volume between front conductive member 12 and a rear conductive member 16, positioned substantially parallel to the front member. Each of front and rear members 12 and 16 are fabricated of a substantially transparent, conductive material, such as indium oxide, tin oxide, and the like. Rear member 16 is supported by a rear substrate 18, which may be fabricated of a substantially transparent material, similar to front substrate 11, or of a highly reflective material. The rear substrate may be made highly reflective by fabrication of a highly reflective coating upon the interior surface 18*a* thereof, which surface supports transparent member 16. The specific optical properties of rear substrate 18** are determined by the specific type of liquid crystal display to be fabricated, ie., light-transmissive, or light-reflective, as otherwise well known to the art.

Display 10 is utilized to form one of a plurality of distinctly different symbols, characters, and indicia by causing combinations of segments 20 to appear, upon the front substrate outwardly-facing surface **11*b***, as dark shapes against the relatively light background of the remainder of the display cell front surface.

To form the indicia, each member 12 (FIG. 2*b*) or 16 (FIG. 2*a*) includes a plurality of conductive segment electrodes **22*a*-22*d* and 24*a*-24*d*, respectively, arranged to form the desired indicia-forming pattern. Illustratively, each member has four indicia-forming segment electrodes, each positioned to form one side of a square and so arranged that, when the cell is assembled, the segment electrodes for each side of the square are arranged in registration, e.g. upper segment electrode 24*a* of member 16 is positioned directly behind and in registration with upper segment electrode 22*a* of the front member. A conductive electrode lead 26*a*-26*d* and 28*a*-28*d*, is integrally joined to an associated one of segment electrodes 24*a*-24*d* and 22*a*-22*d*, respectively; each lead is so arranged as to connect the associated segment electrode to one of connection pads 30*a*-30*h*, without crossing the area bounded by any other segment electrode or its connective lead, of both members, i.e. a particular lead is positioned such that there is no overlap thereof with the segments of the member of which the lead is a part and there is also no overlap of any connective leads associated therewith on the remaining member, when the members are aligned. Thus, all of interconnecting leads 26*a*-26*d* and 28*a*-28*d* are deliberately prevented from being in registration with any of the remaining leads, and with all of segment electrode areas 22*a*-22*d* and 24*a*-24*d*, when the members 12 and 16 are properly positioned within cell 10 with the segments in registration. A background electrode 12*a* or 16*a*, respectively, is formed on the respective front and rear members 12 and 16 and is isolated from each of the segments and leads of that member by means of channels 35 formed around all of the segment areas and their connective leads in that member. The background electrode of each member thus covers all of the area not forming one of the segment electrodes, the conductive leads therefor or the channels electrically isolating the leads and segment electrode areas from the background electrode. A connection point 37*a* or 37*b* is provided for forming an electrical connection to background electrode 16*a* or 12*a***, respectively.

For purposes of illustration, it is assumed that providing an AC voltage of sufficient amplitude across a portion of liquid crystal material layer 14 will cause light to be transmitted through the corresponding portion of cell 10 with relatively little attenuation, to form a "bright" area, and that removal of the AC voltage, or a decrease of the amplitude thereof to be less than the liquid crystal material threshold amplitude $V_{TH}$, will cause the associated area of the cell to be placed in the light-absorptive, or "dark" condition. Thus, if a bright background is desired, all of the liquid crystal material layer bounded by portions of both background electrodes 12 and **16*a* must have an AC voltage impressed thereacross of magnitude sufficiently greater than the threshold voltage amplitude to cause light-transmission therethrough with relatively low attenuation. Similar driving voltage constraints are obtained for those of segment areas 20 which are to be in the bright condition and for all of the areas delineated by conductive leads 26*a*-26*d* and 28*a*-28*d*, whereby the "off" segments and all of the leads merge into the bright background. Conversely, those of segment areas 20** which are to be in the "on", or dark, condition (and therefore visible against the bright background) require that the voltage across the intermediate liquid crystal layer be of an amplitude sufficiently less than the threshold voltage amplitude to cause the intermediate liquid crystal layer to be in the highly absorptive condition.

Referring now to FIGS. 3*a*-3*c*, one preferred embodiment for operating the cell to obtain the aforementioned dark indicia upon a light background, with bright (essentially invisible) lead areas merging into the background, is illustrated; like reference designations are utilized for like elements of FIG. 1. In accordance with the the invention, the background electrode **16*a* of rear member 16 is driven by a sinusoidal waveform having a first frequency $F_1$ and a first amplitude $V_1$ and having a phase $\phi_1$ of 180° with respect to an arbitrary phase reference. All of the segment electrodes 24*a*-24*d* of rear member 16 are simultaneously driven by another sinusoid having the same frequency $F_1$ and amplitude $V_1$ as the sinusoidal waveform driving the background electrode, but having a $\phi_2$ of 90° with respect to the arbitrary phase reference. Thus, all of the electrode areas of rear member 16 are continuously driven by one of two sine wavees having identical substantially constant frequency and amplitude, but having a 90° phase difference therebetween. The background electrode 12*a*** of the front member is driven by a sinusoidal waveform having the same frequency and amplitude, but having a phase $\phi_3$ of about −45° with respect to the arbitrary phase reference.

Each of the connection contacts **30*e*-30*h*, for the corresponding one of segment electrodes 22*a*-22*d*, is coupled to the common contact of one of a like plurality of single-pole, two-position switch means $S_a$–$S_d$. A first pole of each of the plurality of switch means is coupled in parallel, via bus 42, to a source of a sinusoidal waveform having the substantially constant frequency $F_1$ and the substantially constant amplitude $V_1$, but having another phase $\phi_4$ of $+45°$ with respect to the arbitrary phase reference. The remaining contact position of each switch means is coupled in parallel to a bus 45 driven with a sinusoidal waveform having the same voltage and frequency as the other sinusoidal waveforms, and having a phase $\phi_5$ of about $-45°$ with respect to the arbitrary phase reference; as the $\phi_5$ waveform is substantially identical to $\phi_3$ waveform, in this present embodiment, the front member background electrode contact 37***b* could be connected to the $\phi_5$ waveform on bus 45. Each of switch means $S_a$–$S_d$, which may be mechanical, electromechanical, or electronic in nature, is independently actuatable to couple the associated one of segment electrodes 22*a*–22*d* to either bus 42 or bus 45, whereby the associated segment electrode is driven by the sinusoid having a phase of, respectively, $\phi_4$ or $\phi_5$, with respect to the arbitrary phase reference.

The various sinusoidal voltages may be, in one preferred embodiment, derived from a single oscillator 50 (FIG. 3*c*) producing a sinusoidal output at the frequency $F_1$ and an arbitrary phase reference. The output of oscillator 50 is phase shifted by each of four phase shift networks 51*a*–51*d* having substantially equal amplitude responses at the frequency $F_1$ in use and each having that phase shift required to produce the proper $\phi_1$–$\phi_4$ waveforms (with the $\phi_5$ waveform being realized, identically, as the $\phi_3$ waveform). Thus, the first phase shift network 51*a* has a phase shift of $+180°$ to provide the $\phi_1$ waveform, while the remaining three networks 51*b*–51*d* have respective $+90°$, $+315°$ and $+45°$ phase shifts to provide the 90° phase for the $\phi_2$ waveform, the $-45°$ phase for the $\phi_3$ and $\phi_5$ waveforms and the $+45°$ phase for the $\phi_4$ waveform, respectively. It should be understood that the number of networks may be reduced to three by utilizing the oscillator output directly as one of the waveforms and referencing the phases of the remaining three waveforms to that waveform; that is, if the output of oscillator 50 is connected directly to the $\phi_3$ and $\phi_5$ terminals, for example, the network 51*c* is dispensed with and the remaining three networks must have respective phase shifts of $+90°$ for network 51*d*, whereby waveform $\phi_4$ has a phase of $+90°$ with respect to the oscillator output; a phase shift of $+225°$ for network 51*a*, whereby waveform $\phi_1$ has a phase of 225° with respect to the oscillator output; and a phase shift of $+135°$ for network 51*b*, whereby the waveform $\phi_2$ has a phase of $+135°$ with respect to the oscillator output.

In operation, the net AC voltage across each small portion of the liquid crystal layer is determined by the difference in the phases of the voltages driving the electrodes bounding that particular liquid crystal portion. If the pair of voltages have a relatively small phase difference, e.g., about 45° in this particular preferred embodiment, the net voltage V (FIG. 3*b*) across the liquid crystal layer is relatively small and, by proper selection of the sinusoidal waveform amplitude $V_1$, can be established to be a voltage $V_a$ which is less than the threshold voltage $V_{TH}$, whereby the liquid crystal material, having a transmission versus net voltage curve 50, has a relatively small coefficient of transmission $T_D$, and absorbs a substantial portion of the light entering that portion of the liquid crystal layer. Other portions of the liquid crystal layer are driven by sinusoidal voltages having a phase difference of $\pm 135°$, whereby a relatively larger amplitude $V_b$ of AC voltage appears thereacross; amplitude $V_b$ is established to be greater than the threshold voltage $V_{TH}$ of the liquid crystal material, whereby that portion of the liquid crystal layer has a greater coefficient of light transmission $T_L$ and absorbs relatively little of the light passing therethrough. Thus, those portions having a $\pm 135°$ phase difference therebetween appear to be "bright" and the portions having a $\pm 45°$ phase difference appear to be "dark".

As the rear background electrode 16*a* is always driven with a phase $\phi_1$ of $180° = -180°$, and the front background electrode 12*a* is always driven with a waveform of a $\phi_3$ of $-45°$, a waveform of 135° net phase difference exists therebetween, whereby the background area always has a higher transmission level $T_L$ and is in the "bright" condition. The rear segment electrodes receive the $\phi_2$ waveform with a phase of 90°; if the corresponding front segment electrode is energized with the $\phi_4$ waveform, a net 45° phase difference exists therebetween and the area defined by the front segment electrodes (driven by the $\phi_4$ waveform) is in the "off" or "dark" condition to cause dark indicia to be viewed. Thus, as illustrated in FIG. 3*a*, switch means $S_b$ and $S_d$ are positioned to couple the $\phi_4$ waveform to the associated front segment electrode 22*b* and 22*d*, respectively, whereby the areas defined by these electrodes is "dark". If the $\phi_5$ waveform is coupled to a front electrode area, e.g., as by the illustrated switch means $S_a$ and $S_c$ coupling associated front segment electrodes 22*a* and 22*c*, respectively, to the $\phi_5$ bus 45, the net phase difference is $\pm 135°$ and the areas defined by the front segment electrode are in the highly light-transmissive or "bright" position. As the leads from each of front and rear segment electrodes 22*a*–22*d* and 24*a*–24*d* are each in registration only with the background electrode of the opposite member, the relative phase difference of the voltage across the portions of the liquid crystal layer bounded by any of the conductive leads is $\pm 135°$ and these lead areas are in the "bright" condition and blend into the "bright" background area. That is, leads on rear member 16 have phase $\phi_2$ of 90°, while the overlapping background electrode of the front member is driven with the $\phi_3$ voltage having a phase of $-45°$, whereby a 135° phase difference is obtained. Each of the leads associated with a front member segment electrode area which is enabled to the "bright" condition, has the $\phi_5$ voltage thereon of $-45°$ and is opposite the rear background electrode with the $\phi_1$ waveform with phase 180°, whereby a net 135° phase shift exists therebetween; the leads to the front segment electrodes defining "dark" areas have the $\phi_4$ waveform with a phase of 45° thereon, and are opposite to the rear background electrode having the $\phi_1$ waveform with 180° phase shift thereon, whereby a net 135° phase shift exists therebetween. Thus, it will be seen that all of the background area and all of the segment electrode leads are always in the "bright" condition while the areas defined by the segment electrodes are selectively energizable between the "dark" and "bright" conditions to define dark indicia upon a light background.

Due to the necessity for driving all the electrodes with waveforms of identical frequency and amplitude, the voltage ratio $(V_b/V_a)$ is substantially fixed at $\sqrt{3}$, whereby the larger amplitude voltage $V_b$ is generally insufficient to drive the associated areas of the liquid crystal layer to saturation, and optimum brightness of the "bright" areas may not be achieved, even if the sinusoidal waveform amplitude $V_1$ is adjusted such that the net voltages $V_a$ and $V_b$ straddle the threshold voltage $V_{TH}$ to provide the best contrast ratio.

Optimum contrast ratio, with saturation of the liquid crystal layer areas, can be achieved by providing the $\phi_2$ and $\phi_4$ waveforms as identical waveforms, having identical amplitudes, frequencies and phases of about 120° relative to the phase of the $\phi_1$ waveform. The $\phi_3$ and $\phi_5$ waveforms are then made identical, with the same frequency and amplitude as the $\phi_1$, $\phi_2$ and $\phi_4$ waveforms, but with a phase of about 240° relative to the phase of the $\phi_1$ waveform and 120° relative to the phase of the $\phi_2$ and $\phi_4$ waveform. The net voltage $V_a$ then goes to zero and, by proper selection of the sinusoidal waveform amplitude $V_1$, the value of $V_b$ is established at a value saturating the particular liquid crystal material utilized.

Referring now to FIGS. 3a, 3b and 3d, another preferred embodiment utilizes sinusoidal or square waveforms having a difference in phase, frequency and/or amplitude for each of the driving voltages, to drive the cell to saturation and achieve optimum brightness. In the multifrequency embodiment, as opposed to the multiphase embodiment driven by the exemplary generator of FIG. 3c, an oscillator 55 produces a sinusoidal or square waveform at the output thereof, at a first amplitude $V_1$ and a first frequency F. The phase of the output of oscillator 55 is designated as the reference phase. The oscillator output is utilized as the $\phi_3$ waveform and is connected to terminal 37b for front background electrode 12a. The oscillator output is connected to the input of an inverter 57 having an output at the same frequency F and amplitude $V_1$ as the oscillator, but having the opposite phase thereof, whereby the $\phi_1$ waveform with phase of 180° is generated and connected to terminal 37a of rear background electrode 16a. A divide-frequency-by-two means 59 also receives the output of oscillator 55 to generate an output having half the frequency (F/2) of the oscillator at a phase angle substantially of 0° with respect to the oscillator output phase. A voltage divider 61, comprising a series resistance element $R_1$ and a shunt resistance element $R_2$, may be utilized to adjust the amplitude of the output of divider means 59 to generate the $\phi_2$ and $\phi_4$ waveforms respectively connected to all of rear segment electrode terminals 30a–30d and to bus 42. A phase inverter 63 is also coupled to the output of divider means 59 to derive a waveform at half the oscillator frequency and having a phase of substantially 180° with respect to the phase of the waveform of divider means 59. Another voltage divider 65, comprising a series resistance element $R_3$ and a shunt resistance element $R_4$, may be utilized at the output of inverter 63 to derive the proper amplitude for the $\phi_5$ voltage to be connected to bus 45. Thus, the background electrodes of both front member 12 and rear member 16 are driven by voltages having identical frequencies and amplitudes, but having a 180° phase shift therebetween, while the front segment electrodes 22a–22d and rear segment electrodes 24a–24d are driven by other waveforms having one-half the frequency and having another amplitude, which amplitude is selected to be less than the amplitude of the waveforms driving the background electrodes. In the preferred embodiment, the segment electrodes of the rear member and the "off" (dark) segment electrodes of the front member are driven with a waveform 180° out of phase with the waveform driving the "on" (bright) segment electrodes of the front member.

In the illustrated preferred embodiment, the driving waveforms (FIG. 4) are square-waves, whereby oscillator 55 is a square-wave generator and divider means 59 may be a flip-flop, with inverters 57 and 63 being logic-type inverters. Preferably, voltage dividers 61 and 65 are configured such that the amplitudes of the opposed-phase square-waves for the $\phi_1$ and $\phi_3$ waveforms have an amplitude $V_1 = AV$ volts, where A is greater than 1, and V is the amplitude of the $\phi_2$, $\phi_4$ and $\phi_5$ square waveforms. Illustratively, the $\phi_1$ waveform (FIG. 4, waveform a) to the rear background electrode has a frequency (F) of 120 Hz., an amplitude (AV) of 10.4 volts and a phase of 180°. The $\phi_3$ waveform (FIG. 4, waveform c) to the front background electrode also has a 120 Hz frequency and a 10.4 volt amplitude, but has a phase of 0°. The waveform for $\phi_2$ and $\phi_4$ (FIG. 4, waveform b) has a frequency (F/2) of 60 Hz and an amplitude (V) of 6 volts, with a relative phase of 0°, and the $\phi_5$ waveform (FIG. 4, waveform d) has a 60 Hz frequency, a 6 volt amplitude and a 180° phase.

In operation, front background electrode 12a is always driven with the $\phi_3$ waveform, and rear background electrode 16a is always driven with the $\phi_1$ waveform, whereby the net voltage across the areas of the liquid crystal layer bounded on both sides by the background electrodes is the $\phi_1$–$\phi_3$ waveform (waveform a of FIG. 5). This "background" waveform has a frequency equal to the frequency F of the oscillator and has a peak-peak amplitude equal to twice the peak-peak amplitude of each of the $\phi_1$ and $\phi_3$ waveforms. Thus, the voltage across the background areas of the liquid crystal layer has a substantially zero DC component and has an RMS value essentially of 2AV volts; if $A = \sqrt{3}$ and $V = 6$ volts, the background area is driven by a net voltage of about 20.8 volts RMS and, with a typical threshold voltage $V_{TH}$ for a liquid crystal layer being on the order of 6 volts, the background areas are driven well into saturation, whereby maximum light-transmission is achieved in the "bright" background areas.

Those front segment electrodes desired to appear in the "dark" condition, e.g. electrodes 22b and 22d, are driven by the $\phi_4$ waveform, while the aligned rear segment electrodes are all driven by the $\phi_2$ waveform. As the $\phi_2$ and $\phi_4$ waveforms are identical, the next voltage difference ($\phi_2$–$\phi_4$) is (as shown by waveform d of FIG. 5) essentially zero volts, whereby the portions of the liquid crystal layer underlaying the "off" segment electrodes are in the highly light-absorbing condition and appear "dark". The remaining front segment electrodes, e.g. 22a and 22c, selectively receive the $\phi_5$ waveform with a phase difference of 180° relative to the $\phi_2$ waveform, of identical frequency and amplitude, continually driving all of the rear segment electrodes; the opposed phases cause a square waveform (waveform e of FIG. 5) at one-half the frequency (60 Hz) of the oscillator and having a peak-peak amplitude of 4V volts, or twice the peak-peak amplitude of each of the $\phi_4$ and $\phi_5$ segment electrode driving waveforms (waveforms b and d of FIG. 4). The liquid crystal layer bounded by the $\phi_2$-driven and $\phi_4$-driven electrodes thus has thereacross a DC component essentially of zero volts amplitude, and a AC component of substantially 2V volts RMS amplitude. In the illustrated embodiment, the "on" segments thus have about 12 volts RMS thereacross and are driven into saturation when the aforementioned liquid material having a threshold voltage of 6 volts is used. Thus, the background area and the areas defined by the "on" electrodes are in saturation and are highly light-transmissive, while the "off"-driven segments are in a highly light-absorbent condition, to yield dark indicia on a bright background.

The leads to the rear segment electrodes are driven by the $\phi_2$ waveform (FIG. 4, waveform b) while the front background electrode, opposite thereto, is driven by the $\phi_3$ waveform (waveform c of FIG. 4), whereby the net voltage across the portions of the liquid crystal layer defined by the rear segment electrode leads is the ($\phi_2$-$\phi_3$) waveform of FIG. 5, waveform c. This waveform has a zero amplitude DC component and AC components of 2V volts RMS or an amplitude of about 12 volts in the illustrated embodiment. Thus, the areas of the liquid crystal layer bounded by the rear segment electrode leads are driven well into saturation and appear in the highly light-transmissive, or "bright", condition. The portions of the liquid crystal layer bounded by the front segment electrode leads have one of the $\phi_4$ waveforms or the $\phi_5$ waveforms thereon, at the front member, and have the $\phi_1$ background, electrode voltage thereon at the rear member. Thus, the areas bounded by the leads associated with the "dark" segment electrode areas impress a net voltage across the liquid crystal layer portions thereunder equal to ($\phi_1$-$\phi_4$), as shown by waveform b of FIG. 5, while the portions associated with the leads of the right segment electrodes impress a net voltage ($\phi_1$-$\phi_5$) across the corresponding liquid crystal layer portion (waveform c of FIG. 5). Accordingly, the liquid crystal layer underlying all of the front member segment electrode leads is driven with essentially a zero amplitude DC voltage component and an AC voltage amplitude of 2V volts RMS, which AC voltage is sufficient to drive the liquid crystal layer portion underlying the front segment electrode leads into optical saturation, whereby all of the leads of front member 12 are in the highly light-transmissive, or "bright", condition and blend into both the bright background and those "bright" segments selectively energized. In this manner, the highest contrast ratio, between the dark indicia-indicating segments and the remainder of the viewable display surface, and the optimum brightness of the "bright" areas is achieved for the display cell, with the segment electrode lead areas being completely merged into the bright areas.

The present invention has been described with respect to several preferred embodiments thereof. Many variations and modifications will now become evident to those skilled in the art. It is my intent, therefore, to be limited only by the scope of the appended claims and not by the specific details of the preferred embodiments described herein.

What is claimed is:

1. A liquid crystal display comprising:

a layer of liquid crystal material, having opposed front and rear surfaces;

a first member adjacent said rear surface and including at least one conductive segment electrode and a conductive background electrode surrounding and insulated from said at least one segment electrode;

a second member adjacent the front surface of said layer and including a like number of conductive segment electrodes, each in registration with an associated segment electrode of said first member, and a conductive background electrode surrounding and insulated from all of the segment electrodes;

each of said first and second members having contact means associated with each of said at least one segment electrode;

each member having lead means for coupling each segment electrode of that member to its associated contact means, each lead means being so positioned as to be in registration only with a portion of the background electrode of the opposite member;

first means for continuously coupling first, second and third waveforms respectively to the first member background electrode, all of said second member segment electrodes, and said second member background electrode; and means connected to each of said segment electrodes of said first member for selectively coupling thereto one of fourth and fifth waveforms;

said first and second waveforms having at least a phase difference therebetween, and said third waveform having at least a phase difference with respect to at least one of said fourth and fifth waveforms, to cause portions of the liquid crystal layer defined by the registered segment electrodes of said first and second members to be in a light-absorptive condition responsive to energization of those segment electrodes by one of said fourth and fifth waveforms, and other portions of the liquid crystal layer defined by the remaining segment electrodes, receiving the other of said fourth and fifth waveforms, to be in a light-transmissive condition, along with the remainder of the display area defined by the background electrodes and the lead means.

2. The liquid crystal display as set forth in claim 1, wherein said first through fifth waveforms are sinusoidal waveforms of substantially identical frequency and amplitude and having respective phases, with respect to an arbitrary phase reference, of 180°, +90°, −45°, +45°, and −45°.

3. The display as set forth in claim 2, further comprising oscillator means for generating a sinusoidal waveform; and a plurality of network means coupled to said oscillator means for shifting the phase of the oscillator output respectively to realize substantially equal amplitude and frequency signals having said phases of −45°, +45°, +90°, and 180°.

4. The display as set forth in claim 1, wherein said first and third waveforms have substantially identical frequencies and amplitudes and have a 180° phase shift therebetween; and said second, fourth and fifth waveforms have another frequency, substantially equal to one-half the frequency of said first and third waveforms, and have substantially identical amplitudes less than the amplitudes of the first and third waveforms, with said second and fourth waveforms having substantially identical phase and essentially in phase opposition to the phase of the fifth waveform.

5. The display of claim 4, wherein the amplitude of the first and third waveforms is about $\sqrt{3}$ times greater than the amplitudes of the second, fourth and fifth waveforms.

6. The display of claim 4, wherein said first through fifth waveforms are square-waves.

7. The display of claim 6, further comprising oscillator means coupled to said first member background electrode for generating a square-wave of said first frequency and said first amplitude;

first inverter means coupled between said oscillator means and said second member background electrode for generating a square-wave of said first frequency and said first amplitude, but of essentially opposite phase from the square-wave generated by said oscillator means;

frequency divider means coupled to said oscillator means for generating a square-wave having one-half the frequency of the square-wave generated by said oscillator means;

first means for scaling the amplitude of the square-wave-form produced by said divider means, for coupling to all of the segment electrodes of said second member and, as said fourth waveform, selectively to segment electrode of said first member;

second inverter means coupled to the output of said divider means for generating a square-wave having a phase opposed to the phase of the square-wave generated by said divider means; and second means coupled to the output of said second inverter means for scaling the amplitude of the waveform produced by said second inverter means to generate said fifth waveform.

8. The display as set forth in claim 7, wherein said first and second scale means provide said second, fourth and fifth means with amplitudes substantially equal to $1/\sqrt{3}$ times the amplitude of said first and third waveforms.

9. The display of claim 8 wherein the amplitudes of said second, fourth and fifth means are adjusted to be substantially equal to a threshold voltage of the liquid crystal of said display.

10. The liquid crystal display as set forth in claim 1, wherein said first through fifth waveforms are sinusoidal waveforms of substantially identical frequency and amplitude and having respective phases, with respect to an arbitrary phase reference, of 0°, 120°, 240°, 120°, and 240°.

11. A method for displaying dark indicia upon a light background in a liquid crystal display, comprising the steps of:

(a) providing a layer of liquid crystal material having opposed front and rear surfaces;

(b) providing first and second members respectively adjacent to said front and rear surfaces of the layer and each having at least one conductive segment electrode and a background electrode surrounding, but insulated from, said at least one segment electrode;

(c) positioning the segment electrodes of the first and second members to be in registration;

(d) providing a contact for each segment electrode of each member and a conductive lead coupling each segment with its associated contact;

(e) positioning each conductive lead so as to be only in registration with a portion of the background electrode of the opposite member;

(f) exciting the background electrode of the first member with a first waveform having at least a first phase;

(g) exciting the segment electrodes of the second member, and the leads therefor, with a second waveform having at least a phase thereof substantially opposed to the phase of the first waveform;

(h) exciting the background electrode of the second member with a third waveform having one of the frequency, phase and amplitudes thereof differing from the first and second waveforms;

(i) selectively exciting each of the segment electrodes of the second member, and the leads therefor, with one of fourth and fifth waveforms, each having at least one of the phase, frequency and amplitudes thereof differing from said third waveform;

(j) causing portions of the liquid crystal layer defined by the registered segment electrodes of said first and second members to be in a light-absorptive condition responsive to energization of those segments of the second member by one of said fourth and fifth waveforms; and (k) causing other portions of the liquid crystal layer defined by the remaining segment electrodes of the second member, receiving the other of said fourth and fifth waveforms, to be in a light-transmissive condition, along with the remainder of the display area defined by the background electrode and all of the segment electrode leads.

12. The method set forth in claim 11, wherein steps (f)-(i) include the step of selecting the first through fifth waveforms to be sinusoidal waveforms.

13. The method as set forth in claim 12, further comprising the step of establishing the frequencies of the first through fifth waveforms to be substantially identical.

14. The method as set forth in claim 12, further comprising the step of establishing the amplitudes of the first through fifth waveforms to be substantially identical.

15. The method as set forth in claim 12, further comprising the step of providing the first waveform and second waveform with a 90° phase difference therebetween.

16. The method set forth in claim 15, further comprising the steps of providing the third and fifth waveforms with substantially identical phase; and providing the fourth waveform with a phase substantially equal to 90° with respect to the phase of the third and fifth waveforms.

17. The method as set forth in claim 16, further comprising the step of providing the fourth waveform with a phase substantially equal to 45° with respect to the phase of the second waveform.

18. The method as set forth in claim 11, further comprising the step of providing the first through fifth waveforms as having square waveforms.

19. The method as set forth in claim 18, wherein step (f) includes the step of providing the first square waveform with a first amplitude at a first frequency.

20. The method as set forth in claim 19, wherein step (h) includes the step of providing the third waveform with substantially the same amplitude and frequency as the first waveform, and having a phase substantially opposed to the phase of the first waveform.

21. The method as set forth in claim 20, wherein steps (g) and (j) includes the steps of providing the second and fourth waveform with substantially identical frequencies, amplitudes, and phases; and providing the fifth waveform with a frequency and amplitude substantially identical to the frequency and amplitude of the second and fourth waveforms, and with a phase substantially opposed to the phase of the second and fourth waveforms.

22. The method as set forth in claim 21, further comprising the step of providing the second, fourth and fifth waveforms with an amplitude less than the amplitude of the first and third waveforms and with a frequency substantially equal to one-half the frequency of the first and third waveforms.

23. The method as set forth in claim 22, further comprising the step of providing the first and third waveforms with an amplitude substantially equal to $\sqrt{3}$ times greater than the amplitudes of the second, fourth and fifth waveforms.

* * * * *